United States Patent Office 3,356,689
Patented Dec. 5, 1967

3,356,689
REARRANGEMENT OF ENAMINES TO FORM
7-AMINOCOUMARINS
Jorg Haeberli, Warwick, R.I., assignor to Geigy Chemical
Corporation, Greenburgh, N.Y., a corporation of
Delaware
No Drawing. Filed Feb. 28, 1966, Ser. No. 530,334
11 Claims. (Cl. 260—343.2)

The present invention relates to a new improved process for the preparation of 7-aminocoumarin derivatives.

In particular the process of this invention concerns the preparation of 7-aminocoumarin derivatives which are defined by the general formula:

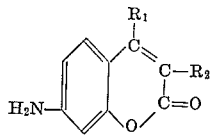

wherein $R_1$ represents hydrogen or an alkyl group and $R_2$ stands for hydrogen or an alkyl or aryl group.

The 7-aminocoumarin derivatives prepared by the new process of this invention have fluorescent properties and thus are useful as optical brightening agents. They can also be employed as intermediates for the production of certain other optical brightening agents in accordance with methods known or obvious to those skilled in the art.

U.S. Patent No. 3,008,969 teaches that 7-aminocoumarins of the type defined by Formula I can be synthesized by condensing a β-keto ester with ethyl m-hydroxyphenyl carbamate in the presence of a specified cyclizing agent, and subsequently hydrolysing the carbamate group. The ethyl m-hydroxyphenyl carbamate used in this prior art process is, thus, an aminophenol wherein the amino group is protected by a carbalkoxy group. The prior patent teaches specifically that the amino group must be protected in the synthesis.

The fact that the free amino group must be protected prior to condensation and liberated after condensation involves multiple operations which are complex, time consuming, and uneconomical.

Another approach which overcomes some of the foregoing difficulties has been to react an aminophenol with β-substituted acrylic acids and derivatives thereof in a reaction requiring an inert organic solvent and the presence of a Lewis acid as the condensing agent. This process therefore involves the use of expensive catalysts and requires the reaction be carried out in the presence of a solvent, both of which, complicate the procedure, require additional equipment, particularly in a commercial scale operation.

This invention overcomes the disadvantages of the prior art by providing a means of producing 7-aminocoumarins by the rearrangement, without a separate solvent or a catalyst such as a Lewis acid, of an enamine of the formula:

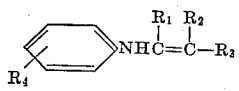
IIA

Wherein $R_1$ and $R_2$ are as defined in Formula I; however, alkyl and aryl are preferably lower (1–4 carbon atoms) alkyl and phenyl, respectively, $R_3$ is carboxyl, alkoxycarbonyl, preferably lower alkoxy (1–4 carbon atoms), phenoxycarbonyl, nitrile, or an amide such —$CONHR_5$ wherein $R_5$ is hydrogen, alkyl, preferably lower alkyl, or phenyl and $R_4$ is hydrogen, hydroxy, nitro, alkyl or alkoxy, but preferably lower alkyl, or lower alkoxy; however, $R_4$ must be 3-hydroxy when $R_8$ in Formula III below is other than 3-hydroxy;

Or an enamine of the formula:

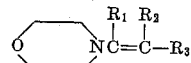
IIB wherein $R_1$, $R_2$, and $R_3$ are defined as above; or an enamine of the formula

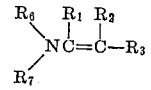
IIC wherein $R_1$, $R_2$, and $R_3$ are as defined above, and $R_6$ may be alkyl, preferably lower n-alkyl, or aryl, preferably phenyl and $R_7$ may be alkyl, preferably lower n-alkyl in the presence of an amine of the formula

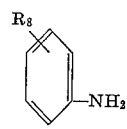
III wherein $R_8$ is hydrogen, hydroxy, methoxy or nitro; however, where the enamine employed is of Formula IIA and $R_4$ is other than 3-hydroxy, or of Formula IIB, or of Formula IIC, then in such cases $R_8$ must be fixed in the meta position to the amino group in Formula III, i.e. the amine of Formula III must then be 3-aminophenol. The amine of Formula III is the only catalyst necessary for the successful preparation of 7-aminocoumarins according to this invention.

The enamines of Formula II A, B, C may be prepared by known prior art methods. For example, a general method for synthesizing most of the enamines of Formula II A comprises reacting an amine of Formula III with an acrylic acid derivative of the formula:

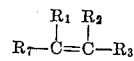
IV wherein $R_1$, $R_2$, and $R_3$ are as defined above, and $R_7$ is a group such as hydroxy, alkoxy, or amino, in the presence of an inert solvent such as benzene, toluene, or nitrobenzene, at temperatures sufficient to remove the water, alcohol or ammonia formed.

The rearrangement of one mole of an enamine of Formula II may be carried out by the process of this invention in the presence of about 0.05 to about 1.50 moles of the amine of Formula III, however a molar ratio of amine to enamine of 1:1 is preferred. While excesses of the amine may be employed without deleterious effects, no improvement in yield is obtained.

While it is preferred that the rearrangement of the enamines of Formula II in the presence of the amines of Formula III employ as starting materials enamines which have been isolated, it is possible to carry out the process by starting with the acrylic acid derivatives of Formula IV and reacting them with an equivalent amount of amines of Formula III in an inert solvent such as benzene, stripping the solvent, and then adding to the residue from 0.05 to 1.5 additional equivalents of the amine of Formula III, preferably one equivalent, and then completing the preparation of the desired 7-aminocoumarin following the same procedure as if starting with the isolated enamines.

The rearrangement of the enamines of Formula II according to the process of this invention can be carried out in a temperature range of about 100° C. to about 225° C., the preferred being from about 155° C. to about 170° C.

While an inert solvent such as benzene, chlorobenzene, nitrobenzene may be used if desired, higher yields and purer products are obtained in the absence of solvents.

The presence of acids and bases such as acid addition salts and alkali salts of the compounds of Formula III decrease the yield of product.

Generally the rearrangement reaction of this invention is completed within 2 to 10 hours depending primarily upon temperature conditions. When operating within the preferred temperature range of 155° C. to 170° C., about 3 to about 4 hours is required to obtain the optimum yield of product. About 3.25 hours seems to be most preferred time when the reaction is carried out at a temperature of about 155° C.

The preferred specific embodiment of this invention comprises the process for producing 7-amino-3-phenylcoumarin by the rearrangement of ethyl 3-(3-hydroxyphenylamino)-2-phenylacrylate by reaction at temperatures of about 155° C. to 170° C. with 3-aminophenol for 3 to 4 hours.

After completion of the rearrangement reaction, the reaction mixture is dissolved by the addition of isopropanol, the solution formed is then treated with hydrochloric acid and the hydrochloride of the desired 7-aminocoumarins readily crystallizes. The 7-aminocoumarin per se can of course be isolated by conventional methods familiar to those skilled in the art.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in any way limit the scope of the invention defined in the claims.

EXAMPLE 1

*Ethyl 3-(3-hydroxyphenylamino)-2-phenylacrylate*

417 g. crude ethyl 3-hydroxy-2-phenylacrylate and 218 g. of 3-aminophenol in 565 g. toluene were held under reflux. The water of reaction distilled and amounted to 28 g. once the pot temperature reached 119° C. The reaction mixture was cooled and ethyl 3-(3-hydroxyphenylamino)-2-phenylacrylate crystallized. The isolated product amounted to 438 g., M.P. 142° C.

EXAMPLE 2

*7-amino-3-phenylcoumarin*

28.3 g. of the enamine, ethyl 3-(3-hydroxyphenylamino)-2-phenylacrylate, was treated with 10.9 g. of 3-aminophenol, at 155° C. for 3.25 hours. The melt was dissolved in 60 ml. isopropanol. 30 g. of 37% hydrochloric acid was added dropwise to the solution. 18.1 g. of 7-amino-3-phenylcoumarin hydrochloride crystallized in needles. From the mother liquors 7.5 g. of 3-aminophenol was recovered. The aminophenol could also be recovered by distillation from the reaction melt under reduced pressure, prior to the addition of the isopropanol.

In the following examples the same general procedure outlined in Example 2 was followed. Only the significant variations from the conditions described in Example 2 are indicated.

EXAMPLE 3

The maximum temperature was 110° C. instead of 150° C. 8.8 g. of 7-amino-3-phenylcoumarin hydrochloride was isolated.

EXAMPLE 4

The maximum temperature of reaction was 200° C. instead of 150° C. 16.2 g. of 7-amino-3-phenylcoumarin hydrochloride was isolated.

EXAMPLE 5

13.8 g. of m-nitroaniline was used instead of 3-aminophenol. The isolated 7-amino-3-phenylcoumarin hydrochloride amounted to 15.5 g.

If p-nitroaniline is employed in lieu of m-nitroaniline the yield is approximately the same.

EXAMPLE 6

9.3 g. of aniline was used instead of 3-aminophenol. 7.6 g. of 7-amino-3-phenylcoumarin hydrochloride was isolated.

EXAMPLE 7

12.3 g. of m-anisidine was employed and the yield was 8.2 g. 7-amino-3-phenylcoumarin hydrochloride.

EXAMPLE 8

The conversion was made using 2.7 g. of 3-aminophenol instead of 10.9 g. The hydrochloride of 7-amino-3-phenylcoumarin isolated amounted to 9.4 g.

EXAMPLE 9

Instead of 10.9 g. of 3-aminophenol, 16.3 g. were used. The hydrochloride of 7-amino-3-phenylcoumarin isolated amounted to 16.0 g.

EXAMPLE 10

The conversion was made in 20 ml. monochlorobenzene added as solvent. 11.4 g. of 7-amino-3-phenylcoumarin hydrochloride was isolated.

EXAMPLE 11

The conversion was made in 40 ml. nitrobenzene added as solvent. 5.2 g. of 7-amino-3-phenylcoumarin hydrochloride was isolated.

EXAMPLE 12

31.3 g. of ethyl 3-(3-nitrophenylamino)-2-phenylacrylate was used instead of ethyl 3-(3-hydroxyphenylamino)-2-phenylacrylate. 15.7 g. of 7-amino-3-phenylcoumarin hydrochloride was isolated.

EXAMPLE 13

The ethyl 3-(3-hydroxyphenylamino)2-phenylacrylate was replaced by 23.8 g. of 3-(3-hydroxyphenylamino)-2-phenylacrylonitrile. 1.5 g. of 7-amino-3-phenylcoumarin hydrochloride was isolated.

EXAMPLE 14

Instead of ethyl 3-(3-hydroxpyhenylamino)-2-phenylacrylate 20.6 g. of ethyl 3-methoxy-2-phenylacrylate was used. 3.2 g. of 7-amino-3-phenylcoumarin hydrochloride was isolated from the reaction mixture.

EXAMPLE 15

19.2 g. of ethyl 3-hydroxy-2-phenylacrylate and 10.9 g. of 3-aminophenol were heated in 20 ml. of benzene until 1.9 g. of water had separated. The benzene was stripped under reduced pressure. To the residue was added 10.9 g. of 3-aminophenol, and the mixture was heated for 3.25 hours at 155° C. From the reaction mixture 15.8 g. of 7-amino-3-phenylcoumarin hydrochloride was isolated.

EXAMPLE 16

19.2 g. of ethyl 3-hydroxy-2-phenylacrylate and 8.7 g. of morpholine were heated in 35 ml. toluene until 1.8 g. of water had separated. The toluene was distilled under vacuum. The residue, 24.6 g. was treated with 10.9 g. 3-aminophenol at 155° C. for 3.25 hours. 5.5 g. of 7-amino-3-phenylcoumarin hydrochloride was isolated.

EXAMPLE 17

19.2 g. of crude ethyl 3-hydroxy-2-phenylacrylate, 10.1 g. of n-dipropylamine and 0.2 g. of p-toluenesulfonic acid were heated in 35 ml. of boiling toluene until all the water of reaction had distilled. The toluenesulfonic acid was neutralized by addition of an equivalent amount of sodium carbonate. The mixture was evaporated to dryness. To the residue 10.9 g. of 3-aminophenol was added. The mixture was held at 150° for 3.25 hours. From the reaction mixture 1.0 g. of 7-amino-3-phenylcoumarin hydrochloride was isolated.

EXAMPLE 18

Same as Example 17, but 13.0 g. of ethyl aceto-acetate and 10.9 g. of 3-aminophenol were used instead of ethyl 3-hydroxy-2-phenylacrylate and n-dipropyl amine, respectively.

4.0 g. of 7-amino-4-methylcoumarin was isolated.

What is claimed is:

1. A process for making 7-aminocoumarins of the formula

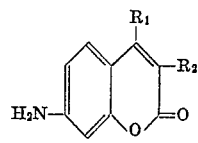    I wherein $R_1$ is hydrogen or alkyl, and $R_2$ is hydrogen, alkyl, or aryl, which comprises rearranging a compound of the formula

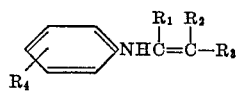    IIA wherein $R_1$ and $R_2$ are as defined above, $R_3$ is carboxyl, alkoxycarbonyl, phenoxycarbonyl, nitrile, or the amide —$CONHR_5$ wherein $R_5$ is hydrogen, alkyl, or phenyl, and $R_4$ is hydrogen, hydroxy, nitro, alkyl, or alkoxy, but $R_4$ is fixed as 3-hydroxy when $R_8$ is other than 3-hydroxy; or a compound of the formula

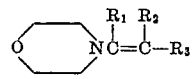    IIB wherein $R_1$, $R_2$, and $R_3$ are as defined above; or a compound of the formula

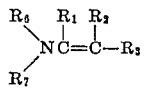    IIC wherein $R_1$ $R_2$, and $R_3$ are as defined above, and $R_6$ is alkyl, or aryl, and $R_7$ is alkyl;

in the presence of an amine of the formula

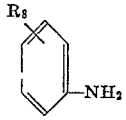    III wherein $R_8$ is hydrogen, hydroxy, alkoxy or nitro; and $R_8$ is fixed as 3-aminophenol when IIA is used and $R_4$ is other than 3-hydroxy, or IIB or IIC is used, at a temperature of about 100° C. to about 225° C.

2. A process as claimed in claim 1 wherein the temperature is from about 155° C. to about 170° C.

3. A process as claimed in claim 2 wherein the period of reaction is from about 3 to about 4 hours.

4. A process for making 7-amino-phenylcoumarins comprising rearranging a compound of the formula

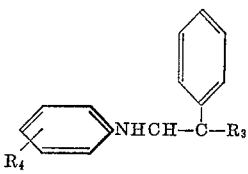

wherein $R_3$ is carboxyl, alkoxycarbonyl, phenoxycarbonyl, nitrile, or the amide —$CONHR_5$ wherein $R_5$ is hydrogen, alkyl, or phenyl, and $R_4$ is hydrogen, hydroxy, nitro, alkyl, or alkoxy, $R_4$ is fixed as 3-hydroxy when $R_8$; is other than 3-hydroxy in the presence of an amine of the formula

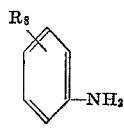    III wherein $R_8$ is hydrogen, hydroxy, alkoxy or nitro; and $R_8$ is fixed as 3-aminophenol when $R_4$ is other than 3-hydroxy, at a temperature of about 100° C. to about 225° C.

5. A process as claimed in claim 4 wherein the temperature ranges from about 155° C. to about 170° C.

6. A process as claimed in claim 4 wherein the amine employed is 3-aminophenol.

7. A process as claimed in claim 4 wherein the compound rearranged is ethyl 3-(3-hydroxyphenylamino)-2-phenylacrylate.

8. A process as claimed in claim 7 wherein the amine employed is 3-aminophenol.

9. A process as claimed in claim 8 wherein the temperature ranges from about 155° C. to about 170° C.

10. A process as claimed in claim 9 wherein the molar ratio of 3-aminophenol to ethyl 3-(3-hydroxyphenylamino)-2-phenylacrylate is about 1:1.

11. A process as claimed in claim 10 wherein the rearrangement is carried out at about 155° C. for a time period of 3 to 4 hours, then the reactant mixture is dissolved in isopropanol, and the 7-amino-3-phenylcoumarin is isolated in the form of its hydrochloride by the addition of hydrochloric acid to the isopropanol solution.

References Cited

UNITED STATES PATENTS 2,680,747    6/1954    Williams et al.

JOHN D. RANDOLPH, *Primary Examiner.*

JAMES A. PATTEN, *Examiner.*